(12) United States Patent
Anckar et al.

(10) Patent No.: US 7,986,971 B2
(45) Date of Patent: Jul. 26, 2011

(54) NETWORK AND METHOD FOR SHARING RADIO ACCESS NODES BETWEEN CORE NETWORKS

(75) Inventors: Lars Anckar, Espoo (FI); Tuomo Flytström, Helsinki (FI); Jyrki Kaasinen, Espoo (FI); Pekka Anttalainen, Helsinki (FI); Antti Jokinen, Espoo (FI); Jari Salo, Tampere (FI)

(73) Assignee: Nokia Corporation, Espoo (FI)

( * ) Notice: Subject to any disclaimer, the term of this patent is extended or adjusted under 35 U.S.C. 154(b) by 1958 days.

(21) Appl. No.: 10/471,381

(22) PCT Filed: Mar. 11, 2002

(86) PCT No.: PCT/FI02/00187
§ 371 (c)(1),
(2), (4) Date: Sep. 9, 2003

(87) PCT Pub. No.: WO02/073993
PCT Pub. Date: Sep. 19, 2002

(65) Prior Publication Data
US 2004/0105429 A1 Jun. 3, 2004

(30) Foreign Application Priority Data
Mar. 9, 2001 (FI) .................................. 20010483

(51) Int. Cl.
*H04M 1/00* (2006.01)
(52) U.S. Cl. ................. 455/561; 455/552.1; 455/550.1; 455/452.1; 455/452.2; 455/453; 370/352; 370/395.31; 370/395.43

(58) Field of Classification Search ................ 455/436, 455/437, 439, 442, 444, 422.1, 524, 561, 455/552.1, 450, 550.1, 452.1, 452.2, 453; 370/328, 338, 349, 352, 395.31, 395.43
See application file for complete search history.

(56) References Cited

U.S. PATENT DOCUMENTS

| | | | |
|---|---|---|---|
| 6,047,176 A * | 4/2000 | Sakamoto et al. | 455/422.1 |
| 6,173,189 B1 * | 1/2001 | Lockhart | 455/561 |
| 6,845,238 B1 * | 1/2005 | Muller | 455/436 |
| 6,963,552 B2 * | 11/2005 | Sabat et al. | 370/338 |
| 7,065,346 B2 * | 6/2006 | Kinnunen | 455/418 |
| 7,224,977 B2 * | 5/2007 | Cavalli et al. | 455/452.1 |
| 7,561,879 B2 * | 7/2009 | Kuchibhotla et al. | 455/435.2 |

(Continued)

FOREIGN PATENT DOCUMENTS

JP 08-237731 9/1996

(Continued)

OTHER PUBLICATIONS

Papadias and Foschini disclose a space-time coding approach for systems employing four transmit antennas (May-2001), (XP-00215791).*

(Continued)

*Primary Examiner* — Ajit Patel
*Assistant Examiner* — Khai M Nguyen
(74) *Attorney, Agent, or Firm* — Harrington & Smith

(57) ABSTRACT

The invention concerns a method for radio communication in a cellular radio network having a radio access network and a core network (CN), the method comprising connecting at least two different core networks to one radio access network (RAN), and sharing at least one network element (RNC, BTS) of the radio access network (RAN) between the at least two different core networks.

19 Claims, 6 Drawing Sheets

U.S. PATENT DOCUMENTS

2004/0157600 A1 * 8/2004 Stumpert et al. ............ 455/432.1
2006/0166694 A1 * 7/2006 Jeong et al. ................... 455/525

FOREIGN PATENT DOCUMENTS

| JP | 8-280057 | 10/1996 |
|---|---|---|
| JP | 8-307941 | 11/1996 |
| JP | 8-331647 | 12/1996 |
| JP | 9-84107 | 3/1997 |
| JP | 9-215061 | 8/1997 |
| WO | WO 99/66742 | 12/1999 |
| WO | WO 00/01173 | 1/2000 |
| WO | WO 00/60885 | 10/2000 |
| WO | WO 01/15470 | * 3/2001 |
| WO | WO 01/15470 AI | 3/2001 |

OTHER PUBLICATIONS

Japanese Office Action dated Apr. 28, 2008.

* cited by examiner

NETWORK AND METHOD FOR SHARING RADIO ACCESS NODES BETWEEN CORE NETWORKS

TECHNICAL FIELD

The present invention relates to cellular radio networks, and in particular to radio access networks of a cellular radio system.

BACKGROUND

Networks of cellular systems are typically divided into a Radio Access Network RAN and a Core Network CN. Presently the third generation (3G) radio systems are being standardized. One 3G system will be based on WCDMA technology, Wide-band Code Division Multiple Access, over the air interface and thus this technology will be used in the RAN, whereas the CN will be similar to the one existing in GSM (Global System for Mobile communications).

FIG. 1 presents a block diagram of the system architecture of a 3G system. The system comprises the elements shown in FIG. 1, i.e. a mobile station MS, the RAN (marked UTRAN, UMTS Terrestrial RAN where UMTS stands for Universal Mobile Telecommunications System), and the CN. The mobile station MS is radio connected to at least one base station BTS which is connected to a radio network controller (RNC) over the so called Iub interface (and two RNCs may be connected with each other over the so called Iur interface). Further the RAN is connected to the CN over the Iu interface. As shown in the figure the RNC is connected to the MSC (Mobile services Switching Centre) including the VLR (Visitor Location Register) and to the SGSN (Service GPRS Support Node, where GPRS is General Packet Radio Service that is standardized in GSM). Further the SGSN is connected to the GGSN (Gateway GPRS Support Node) and the MSC is connected to the GMSC (Gateway MSC). As seen in the figure at least the MSC, GMSC and SGSN have a connection to the HLR (Home Location Register) and SCP (Service Control Point). The connection to other networks go via the GMSC and the GGSN, where typically circuit switched communication would go via the MSCs (i.e. via the MSC and GMSC) and packet switched communication would go via the GSNs (i.e. via the SGSN and GGSN).

The radio frequencies that the 3G system (that will be based on WCDMA, Wide-band Code Division Multiple Access) will use (in communication between the MS and the BTS) have been agreed by different standardization bodies, and in several countries licenses to build 3G networks have been sold to operators on auctions. These licenses have been tremendously expensive. Also building up a new network additionally requires huge investments to be made on equipment and there therefore exists questions how the operators will be able to make profit and pay off the investments with the 3G system. Moreover, in certain countries there has been given a requirement of a certain (minimum) coverage area in order for the operator to get the 3G network license.

Therefore there is a clear need to seek solutions for saving costs in relation to these new networks.

Document WO 01/15471 discloses the use of two parallel core networks for one BSS (base station sub-system) in order to increase the core network capacity of an operator's network by dynamically spreading the load between the two core networks. When the mobile terminal registers its presence in the location area, the BSS will forward the request dynamically to either of the two core networks based on the core network loading. The solution shown does not save costs but rather adds costs if an operator would use two core networks for each BSS. Further a drawback of the solution described in the WO document is that it can not be implemented as such according to the existing mobile network standards, but would require a change of the present standards.

SUMMARY

According to a first aspect of the invention there is provided a method for radio communication in a cellular radio network having a radio access network and a core network, the radio access network comprising at least a radio network controller and a plurality of base stations, the method comprising
  connecting at least two different core networks to one radio access network, and
  sharing at least one base station of the radio access network between the at least two different core networks by using a first frequency to establish a first cell at the base station for one of the at least two different core networks and using a second frequency to establish a second cell at the base station for another one of the at least two different core networks.

According to a second aspect of the invention there is provided a cellular radio network comprising at least two different core networks and one radio access network connected to each of the at least two core networks, the radio access network comprises at least a radio network controller and a plurality of base stations, and each core network comprises network elements, and at least one base station of the radio access network is configured to be used by each of the at least two different core networks, wherein the base station comprises a transceiver for transceiving at a first frequency to establish a first cell for one of the at least two different core networks and for transceiving at a second frequency to establish a second cell for another one of the at least two different core networks.

According to a third aspect of the invention there is provided a radio network controller comprising:
  means for connecting to at least two different core networks,
  means for connecting to a plurality of base stations,
  allocation means for creating an allocation between traffic to and from one of the plurality of base stations and the two different core networks, wherein the allocation means further comprises a determination of a certain first frequency used at the base station to correspond to a certain one of the at least two core networks to which the traffic is intended, and a determination of a certain second frequency used at the base station to correspond to a certain other one of the at least two core networks in order to allocate the traffic from one of the plurality of base stations to either one of the at least two core networks based on the frequency used at the base station.

According to a fourth aspect of the invention there is provided a base station comprising a transceiver for transceiving at a first frequency to establish a first cell, the communication of which is intended for one of at least two different core networks and for transceiving at a second frequency to establish a second cell, the communication of which is intended for another one of the at least two different core networks.

According to a fifth aspect of the invention there is provided a method for radio communication in a cellular radio network having a radio access network and a core network, the method comprising
  connecting at least two different core networks to one radio access network, and sharing at least one network element of the radio access network between the at least two different core networks, wherein the at least two different core networks belong to different network operators.

According to a sixth aspect of the invention there is provided a cellular radio network comprising at least two different core networks and one radio access network connected to each of the at least two core networks, the radio access network and each core network comprises network elements, and at least one network element of the radio access network is configured to be used by each of the at least two different core networks, wherein the at least two different core networks belong to different network operators.

According to a seventh aspect of the invention there is provided a radio network controller comprising:
means for connecting to at least two different core networks, wherein the at least two different core networks belong to different network operators, and
means for connecting to a plurality of base stations.

According to a eighth aspect of the invention there is provided a base station comprising a first cell, the communication of which is intended for one of at least two different core networks that belong to different network operators and a second cell, the communication of which is intended for another one of the at least two different core networks According to a ninth aspect of the invention there is provided a method for radio communication in a cellular radio network having a radio access network and a core network, the radio access network comprising at least a radio network controller and a plurality of base stations, the method comprising
connecting at least two different core networks to one radio access network, and
sharing at least one base station of the radio access network between the at least two different core networks by
establishing a first cell at the base station for one of the at least two different core networks and using a first code in the first cell corresponding to the one of the at least two different core networks, and
establishing a second cell at the base station for another one of the at least two different core networks and using a second code in the second cell corresponding to the another one of the at least two different core networks According to a tenth aspect of the invention there is provided a cellular radio network comprising at least two different core networks and one radio access network connected to each of the at least two core networks, the radio access network comprises at least a radio network controller and a plurality of base stations, and each core network comprises network elements, and at least one base station of the radio access network is configured to be used by each of the at least two different core networks, wherein the base station comprises a transceiver to establish a first cell at the base station for one of the at least two different core networks by using a first code in the first cell corresponding to the one of the at least two different core networks and to establish a second cell at the base station for another one of the at least two different core networks by using a second code in the second cell corresponding to the another one of the at least two different core networks.

According to an eleventh aspect of the invention there is provided a radio network controller comprising:
means for connecting to at least two different core networks,
means for connecting to a plurality of base stations,
allocation means for creating an allocation between traffic to and from one of the plurality of cells and the two different core networks, wherein the allocation means further comprises a determination of a certain first code used in a first cell to correspond to a certain one of the at least two core networks to which the traffic is intended, and a determination of a certain second code used in a second cell to correspond to a certain other one of the at least two core networks in order to allocate the traffic from one of the plurality of cells to either one of the at least two core networks based on the code used in the cell.

By the definition core network CN there is intended in 3G systems that there is both a the packet switched communication elements (such as SGSN) and the circuit switched communication elements (such as MSC), whereas a MSC (together with a GMSC) can stand for CS CN (circuit switched core network) and SGSN (together with a GGSN) can stand for PS CN (packet switched core network).

In a particular embodiment the two different core networks belong to two different operators, whereby the embodiment comprises sharing at least one element of the radio access network between at least two different network operators. However, one single network operator could also have two different core networks between which the sharing can be made.

One embodiment comprises sharing at least one of a radio network controller (RNC) and a base station (BTS) between at least two different core networks (of different network operators). In a preferred embodiment both RNCs and BTSs are shared between at least two different core networks (i.e between two different network operators). In a network there is a particularly huge number of base stations when a large geographical area is to be covered, such as a complete country. Therefore savings can in particular be achieved by sharing base stations.

Also one embodiment comprises forming with a base station at least two different cells, one for each network operator. In a particular embodiment the different cells are formed by using different frequencies (or frequency bands) for the different operators from the same BTS. Moreover in the different cells different identifications would be used, such as different MNCs (Mobile Network Code). Therefore the mobile station and the user does not automatically see that different operators are not having different base stations but rather share a base station. Therefore each operator is able to send out its own identification.

The sharing can also be done by sharing some but not necessarily all sectors of a base station. This means that the base station is using narrowband antennae that create beams, i.e. sectors to different directions from the base station. For example a cell may comprise three or six different sectors. Thereby the sharing may be done sector-wise and different operators can even create different coverage in that one operator can use different sectors of a base station than another. Likewise the sharing may differ geographically in that not necessarily each base station of the radio access network is used by each of the sharing operator but one operator may use one base station alone and another operator may use another base station alone and thereby different operators may have a bit different coverage areas if they so like. Typically the network of one operator could include several SGSNs and several MSCs.

In a particular embodiment the administration of the sharing is implemented in a radio network controller (RNC) by having a routing table where each cell (of each base station) is defined and also different core network elements of the at least two different core networks are defined. Accordingly an allocation between each cell of one and the same network operator and the core network of the same operator is kept in the routing table of the RNC.

Naturally the sharing of one single radio access network may be equally implemented between several core networks (and therefore between several network operators). For example in case of three network operators each base station would use three different frequencies forming three different cells, each belonging to a different core network (to a different operator).

The present invention can be of help for network operators to quickly build up a new cellular network covering a certain geographic area. This can be done by two or more operators building up one single network in co-operation, which is shared between the operators according to the present invention. This also helps in optimizing the use of the capacity of the network. Namely, in the beginning of a new network the number of subscribers is typically low and increases over time. By the present invention subscribers of different operators are able to utilize the same radio access network and when the number of subscribers increase the operators may slowly start building overlapping networks to meet the demand, and after a while the co-operating operators may have two fully independent networks (whereby the sharing according to the invention may be terminated). However, by two or more operators co-operating in the beginning of the life time of a new network, smaller investments can be made, but still the operators are able to offer a good geographical coverage and have sufficient capacity for the subscribers. Thereby the operators are able to keep the investments on a level where there is directly a good number of paying customers (subscribers) to generate income in relation to the investments made.

This is also a benefit to the subscribers as the operators will be able to keep the service prices on a lower level in that they are not required to build up a completely independent network in the beginning. No expensive roaming is therefore needed as the subscribers may move within the geographical area but during the whole time being served by his/her own operator. This can be compared to the situation presently in the United States where certain operators only cover certain States and if the subscriber moves to a particular State the mobile telephone roames to the network of another operator and the roaming phone calls are presently very expensive. The present invention will help avoid such problems in new networks.

BRIEF DESCRIPTION OF THE DRAWINGS

The invention is described in detail in the following with reference to enclosed figures, in which.

DETAILED DESCRIPTION

Figure 1:
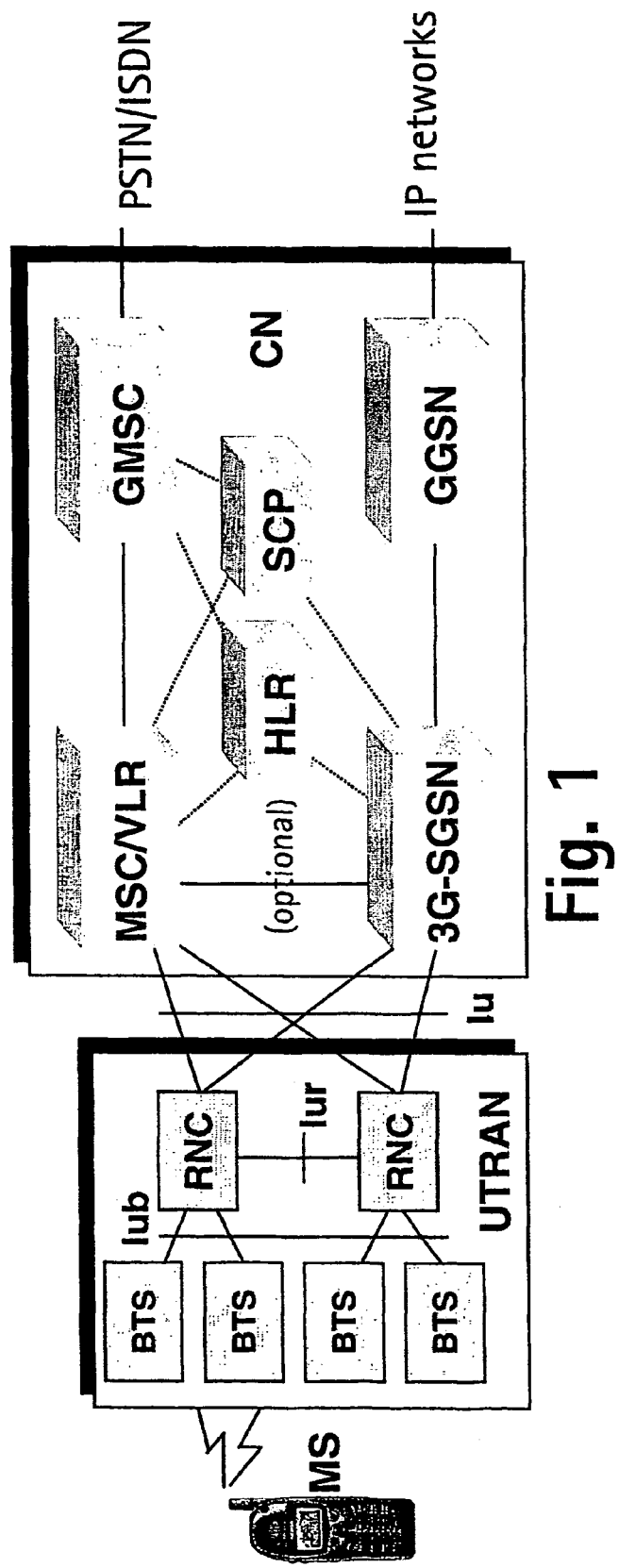
FIG. 1 presents the system architecture of a 3G radio system.
Figure 2:
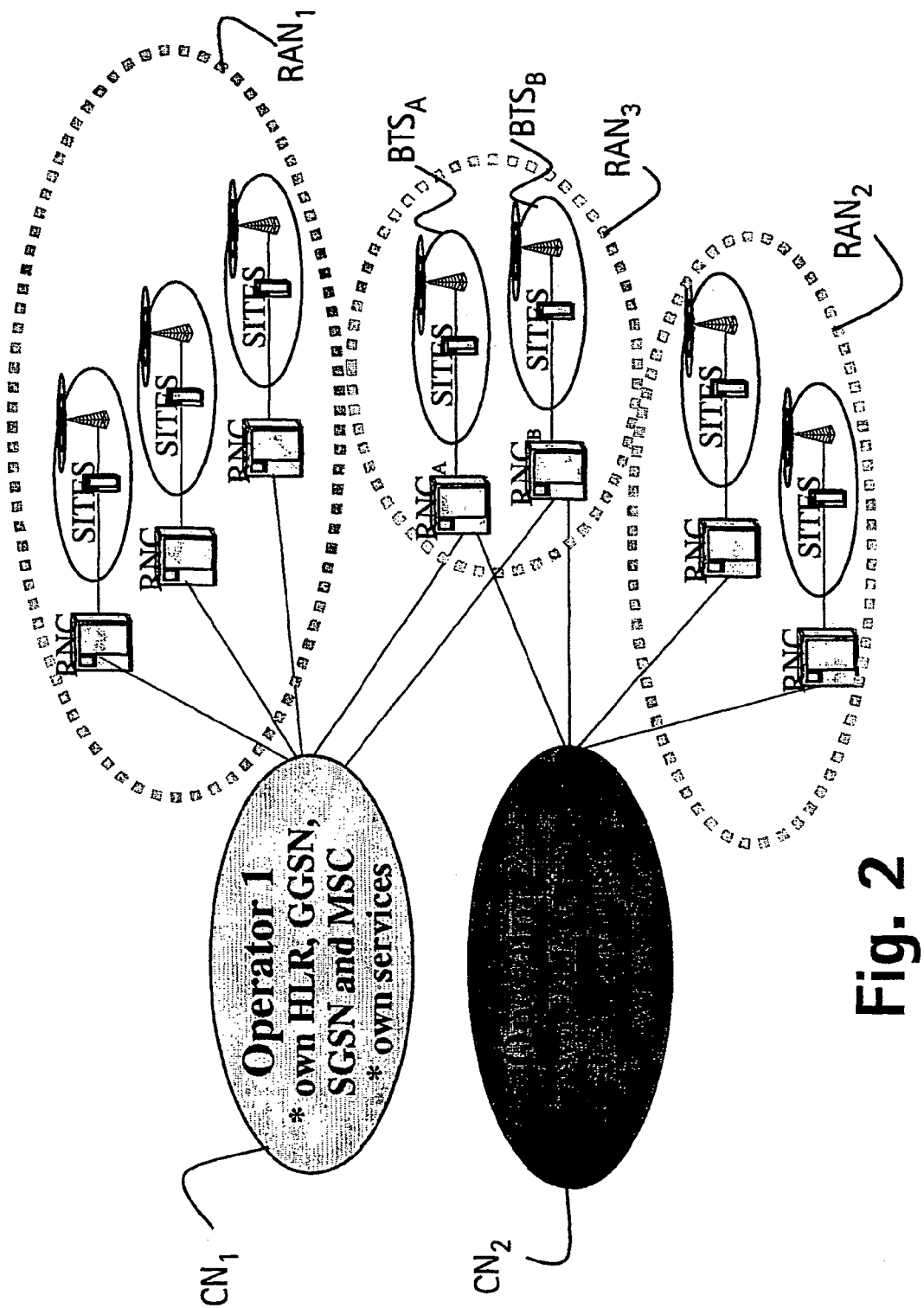
FIG. 2 presents the sharing of the a radio access network between two different operators according to the invention.

Referring now to FIG. 2 there is disclosed the basic concept of the present invention. The figure shows a core network $CN_1$ of a first operator (Operator 1), which includes network elements such as an own HLR, GGSN, SGSN, MSC and possible service elements (servers connected to the MSC and or GSN in a similar manner as a SM-SC, Short Message Service Centre, is connected to the MSC in the GSM network). Similarly there is a second core network $CN_2$ of a second operator (Operator 2), which likewise includes own network elements such as an own HLR, GGSN, SGSN, MSC and possible service elements. The core networks $CN_1$ and $CN_2$ are thus configured and include network elements in the same manner as known from 3G network plans and as shown in FIG. 1. Similar as shown in FIG. 1 there are in FIG. 2 radio access networks $RAN_1$, $RAN_2$, $RAN_3$ connected to the core networks $CN_1$, $CN_2$, where $RAN_1$ is connected to $CN_1$ in a known manner and $RAN_2$ is connected to $CN_2$ correspondingly. The sharing according to the invention is done in the third radio access network $RAN_3$, where both core networks $CN_1$ and $CN_2$ are connected thereto.

Thereby, in this example both operators and thus both core networks $CN_1$, $CN_2$ utilise both radio network controllers $RNC_A$ and $RNC_B$ of $RAN_3$ and also utilize the different base stations represented by references $BTS_A$ and $BTS_B$. As shown in FIG. 1 there are several base stations connected to each RNC and therefore references $BTS_A$ and $BTS_B$ both represent several base stations.

A similar sharing could also be used when the two core networks $CN_1$, $CN_2$ belong to one and the same operator.

The radio network shown in FIG. 2 is thus configured so that operators 1 and 2 can share $RAN_3$ (by having shared RNCs and shared BTSs) and each operator have dedicated own cells through which mobile stations can have access (establish a connection) to the network. This is shown more closely in FIG. 3. Each cell has its own MNC (Mobile Network Code) and MCC (Mobile Country Code) corresponding to the operator.

Figure 3:
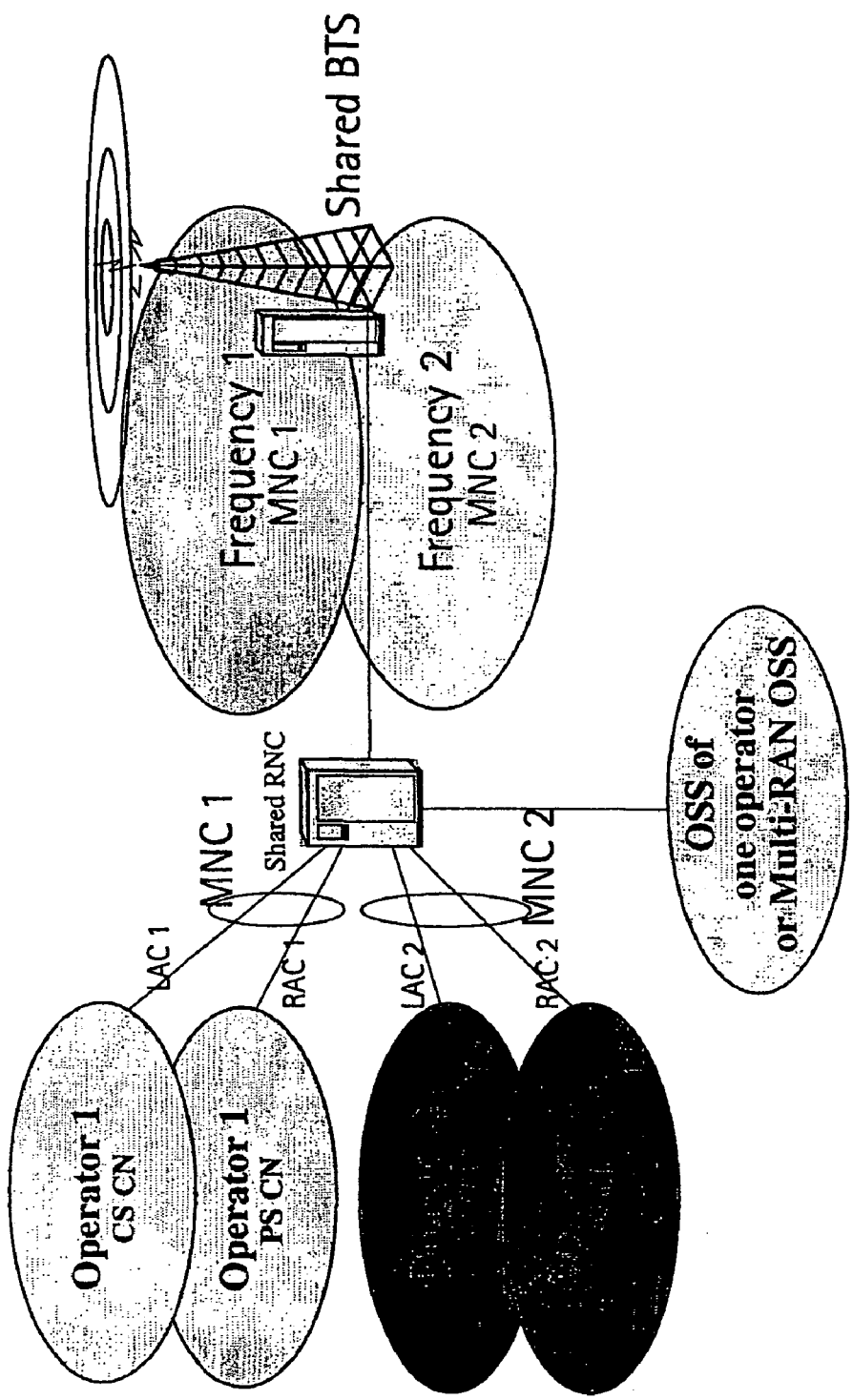
FIG. 3 presents the sharing of a base station between two core networks.

The differentiation between the two operators is based on MNC, and as shown in FIG. 3 MNC1 is used by Operator 1 and MNC2 is used by Operator 2. In practice this means that a shared RNC (such as $RNC_A$ and $RNC_B$) has a preconfigured routing table which contains the MNC information and by using this information the messages are routed to appropriate operators core networks $CN_1$ and $CN_2$. The routing is based on a solution where a cell based determination has been made to corresponding core network CN elements of $CN_1$ and $CN_2$. The different cells are formed by using different frequencies for the different operators' cells from the same base station BTS. Thereby certain frequencies are determined to correspond to certain CN elements.

Referring now to FIG. 3 there is disclosed the principle of sharing a base station. The two different core network assemblies of each operator represent the circuit switched and packet switched portions of the core network. Thereby CS CN of Operator 1 represents the core network elements of Operator 1 in relation to circuit switched communications (i.e. the MSCs) and PS CN of Operator 1 represents the core network elements of Operator 1 in relation to packet switched communications (i.e. the GSNs). Likewise CS CN of Operator 2 represents the core network elements of Operator 2 in relation to circuit switched communications (i.e. the MSCs) and PS CN of Operator 2 represents the core network elements of Operator 2 in relation to packet switched communications (i.e. the GSNs). Each CN assembly is connected to the shared RNC. Division between the CN assemblies is based on LAC (Location Area Code) and RAC (Routing Area Code) so that the operator can determine in which CN traffic goes. Accordingly for circuit switched traffic of operator 1 a first LAC (LAC1) is used and for packet switched traffic of operator 1 a first RAC (RAC1) is used.

Figure 5:
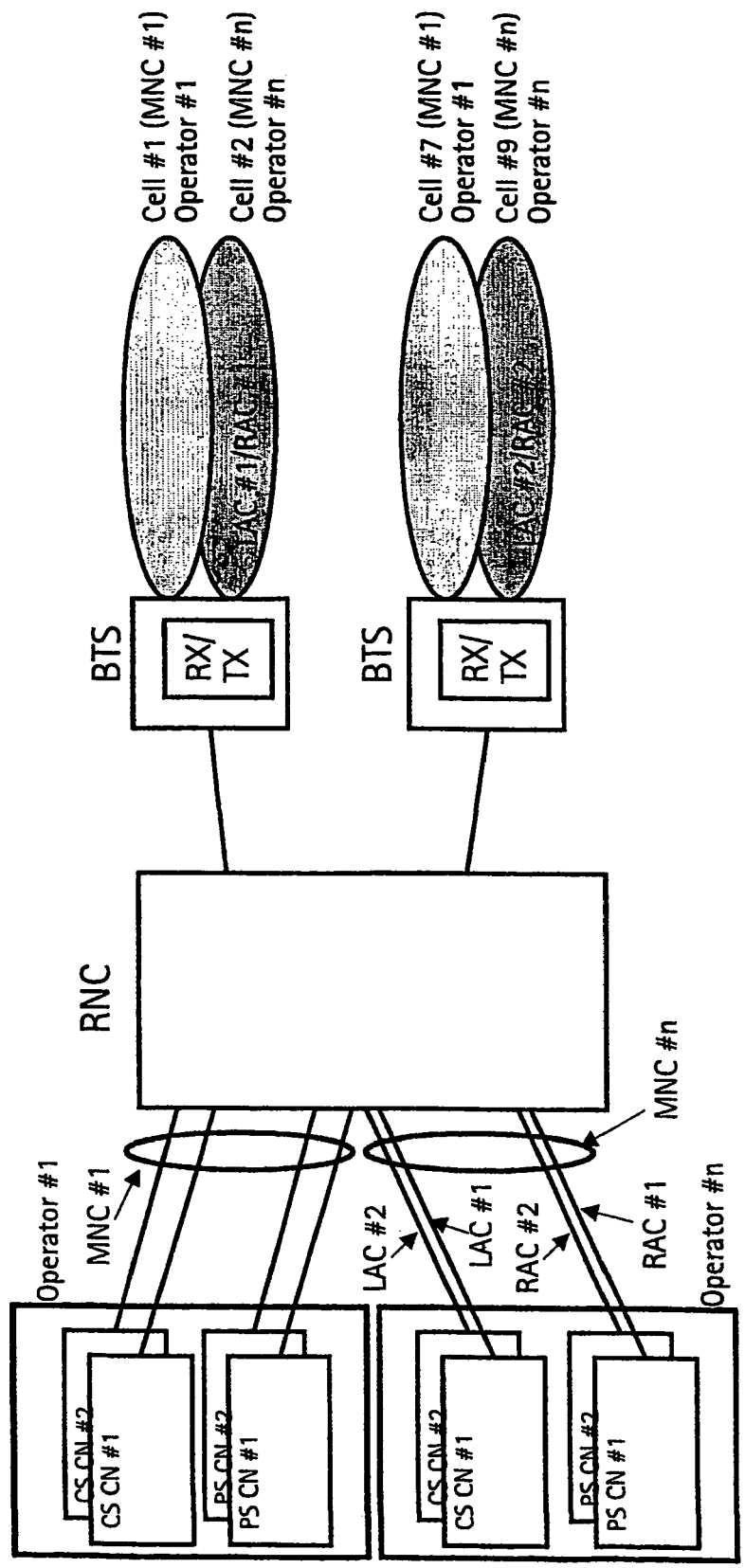
FIG. 5 presents the routing of messages from a core network to a shared base station.

Correspondingly for circuit switched traffic of operator 2 a second LAC (LAC2) is used and for packet switched traffic of operator 1 a second RAC (RAC2) is used. The transceiver RX/TX (see FIG. 5) of shared base station (Shared BTS) uses a first frequency or frequency band (Frequency 1) for establishing a first cell (of operator 1) and uses a different second frequency or frequency band (Frequency 2) for establishing a second cell (of operator 2).

Figure 4:
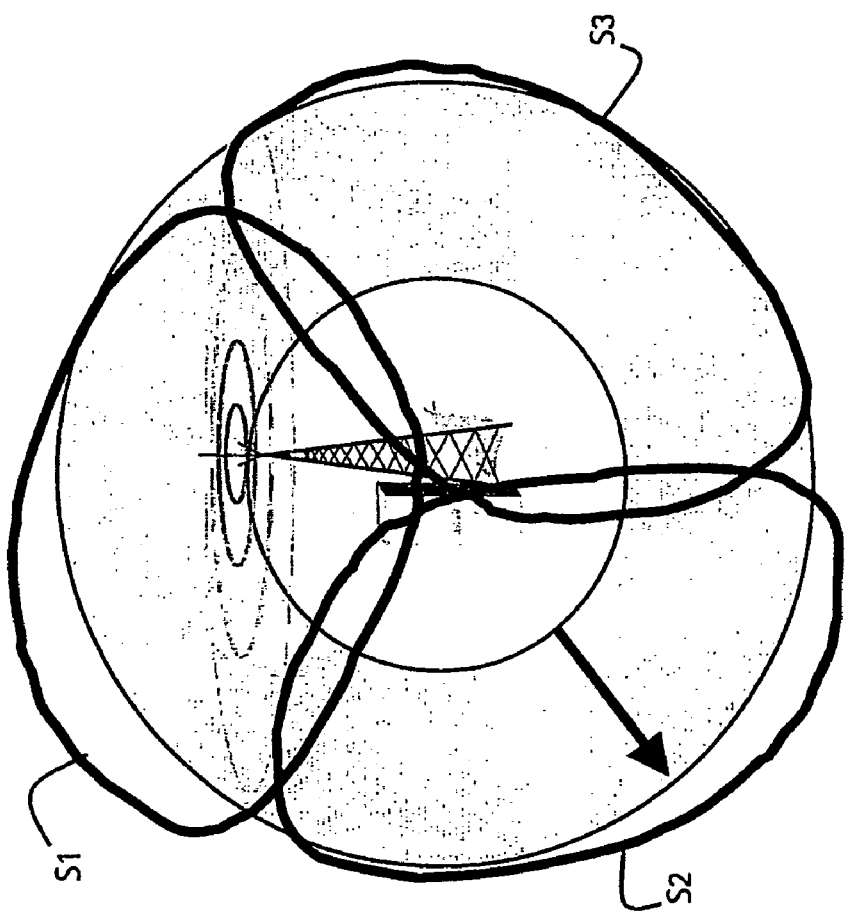
FIG. 4 presents a cell created by a base station.

FIG. 4 shows the concept how typically a cell is formed in WCDMA networks by using narrowbeam antennae. In the example shown in FIG. 4 the cell is formed by three different antennae creating a beam in different directions, each beam thereby forming an own sector S1, S2 and S3. Typically each sector would use a different frequency or code to avoid collisions. Another cell may comprise six different sectors which enable a broader coverage as the beam of an antenna with a narrower beam typically has a better gain and therefore the beam reaches further out. The sharing can be done by sharing the whole cell, i.e. having two similar cells that have all sectors S1, S2, S3 of the cell but use different frequencies (as was described above and shown in FIG. 3). Optionally only some but not necessarily all sectors of the base station would be used by each of the operators. Thereby the sharing may be done sector-wise and different operators can even create different coverage in that e.g. operator 1 can use sectors S1 and S2 of the base station and operator 2 may use sectors S2 and S3 of the base station. Such a sector that is used only by one operator can be created only on one frequency, whereas shared sectors must created on several frequencies, i.e. on two frequencies if two operators use the shared sector. The different sectors can be identified by individual identifications.

Likewise the sharing may differ geographically in that not necessarily each base station of the radio access network is used by each of the sharing operator but one operator (e.g. Operator 1 in FIG. 2) may use one base station alone (e.g. BTS$_A$) and another operator (e.g. Operator 2 in FIG. 2) may use another base station alone (e.g. BTS$_B$) and thereby different operators may have a bit different coverage areas geographically if they so like.

Two sharing determinations are included in the shared RNC. For this purpose the RNC comprises a preconfigured routing table of operators using same physical RNC. Each operator has their own cells defined to by the Cell id, the MNC, and the MCC. Operators are identified with the MNC in the preconfigured routing table and the MNC is forwarded from the RRC (Radio Resource Control, which is a protocol between the mobile station MS and the RAN) to RANAP (Radio Access Network Application Protocol, which is a protocol over the Iu interface) with the first Initial Direct Transfer message inside the RNC. Thereby by linking the information on the RRC and RANAP and MNC a message from a particular base station can be transferred to the correct CN from RANAP. This allows the sharing according to the invention and therefore allows several operators to use one physical RNC. The protocols RRC and RANAP do not require any changes due to the invention, but the message routing is done by transferring the MNC and MCC inside the RNC.

The preconfigured routing table contains also an operator specific list of CN elements serving an area (a routing area and/or a location area depending of the traffic type). Each CN element has its own identification or signaling number based on which it is identified. With this list it is possible for the RNC to route the traffic to the appropriate CN element to serve a particular MS. The selection is done when a signalling connection is first established between the MS and the CN element. Only one CN element of the same type (Circuit Switched CS or Packet Switched PS) shall serve the MS at the same time. Accordingly CS and PS elements are identified separately and the CS and PS traffic is identified separately by CN domain IDs. When there exists several CNs of the same type (e.g. several PS CNs and/or several CS CNs as shown in FIG. 3) these are identified by codes LAC and RAC as was shown and described in connection with FIG. 3.

Routing of messages between the core networks CNs and the radio access network RAN is based on MCC (Mobile Country Code), MNC (Mobile Network Code), LAC (Location Are Code), RAC (Routing Area Code). This is disclosed in more detail in FIG. 5 and Table 1 below which shows an example of a routing table.

TABLE 1

```
>Operator #1 (MCC + MNC)#1
    >>CN Domain Identity
        >>>CS
            >>>>LAC #1 -> CS CN #1
            >>>>LAC #N -> CS CN #n
        >>>PS
            >>>>RAC #1 -> PS CN #1
            >>>>RAC #N -> PS CN #n
>Operator #x (MCC + MNC)#X
    >>CN Domain Identity
        >>>CS
            >>>>LAC #9 -> CS CN #9
            >>>>LAC #Z -> CS CN #z
        >>>PS
            >>>>RAC #6 -> PS CN #6
            >>>>RAC #Y -> PS CN #y
```

As shown in Table 1 circuit switched and packet switched traffic is identified separately by creating an allocation between the circuit switched CN elements and the LAC which identifies the CS traffic. Likewise an allocation is created between the packet switched CN elements and the RAC which identifies the PS traffic. Also above these the CN Domain Identity (CS and PS) is used to differentiate between circuit switched and packet switched traffic. Referring to Table 1 and FIG. 5 there is created an allocation between the circuit switched traffic of a particular cell (e.g. Cell #1) and the CS CN elements of Operator #1 by the definition >>>>LAC #1->CS CN #1. Likewise there is an allocation from cell #N to the CS CN elements of Operator #1 by the definition >>>>LAC #N->CS CN #n. In a similar manner for packet switched traffic there is an allocation from cell #1 to the PS CN elements of Operator #1 by the definition >>>>RAC #1->PS CN #1. Each data is linked to the operator codes (MCC+MNC)#1 of Operator #1. In this manner traffic between cell #1 shown in FIG. 5 to the relevant CN elements is routed correctly by the RNC. Thereby each operator #1 to #n (or #X) sends their own MNC (MNC#1 . . . MNC#n) to their subscribers. Thereby if a subscriber activates cell identification on his/her mobile station the cell id (or logo) of his/her own operator appears on the display. The MCC is used to route a call to the CN of the relevant country (in calls between two different countries). The MCC can particularly be utilized in cells around country boarders.

Further referring to FIG. 3, there is disclosed a Operating Sub-System element (OSS) in connection with the RNC. The OSS is also known by the term NMS (Network Management System), that is used to manage the network by managing features such as access rights, user ID management, security and monitors especially the RANs by collecting alarms and key performance indicators (KPIs) from RAN equipment (from RNCs). The different operators may have separate OSS equipment (an OSS is typically implemented as one or several servers) or may share a common OSS (or may agree that the OSS of one of the operators is used to manage the shared RAN). If one of the operators' OSS is used then the RAN maintenance is done by that operator's OSS and other operators can have access to see their own cells (e.g. through a direct connection from another operator's OSS to the monitoring OSS).

Operators can agree and co-operate on how to divide costs, cells, transmission and operationing of a multi-operator RAN. These kind of issues are handled in the OSS which includes configurable parameters.

The RAN needs to be synchronized with the CNs. In practice this can be implemented by agreeing to which of the at least two different CNs that the shared RAN is synchronized to. Optionally the two CNs may be mutually clock synchronized.

Figure 6:
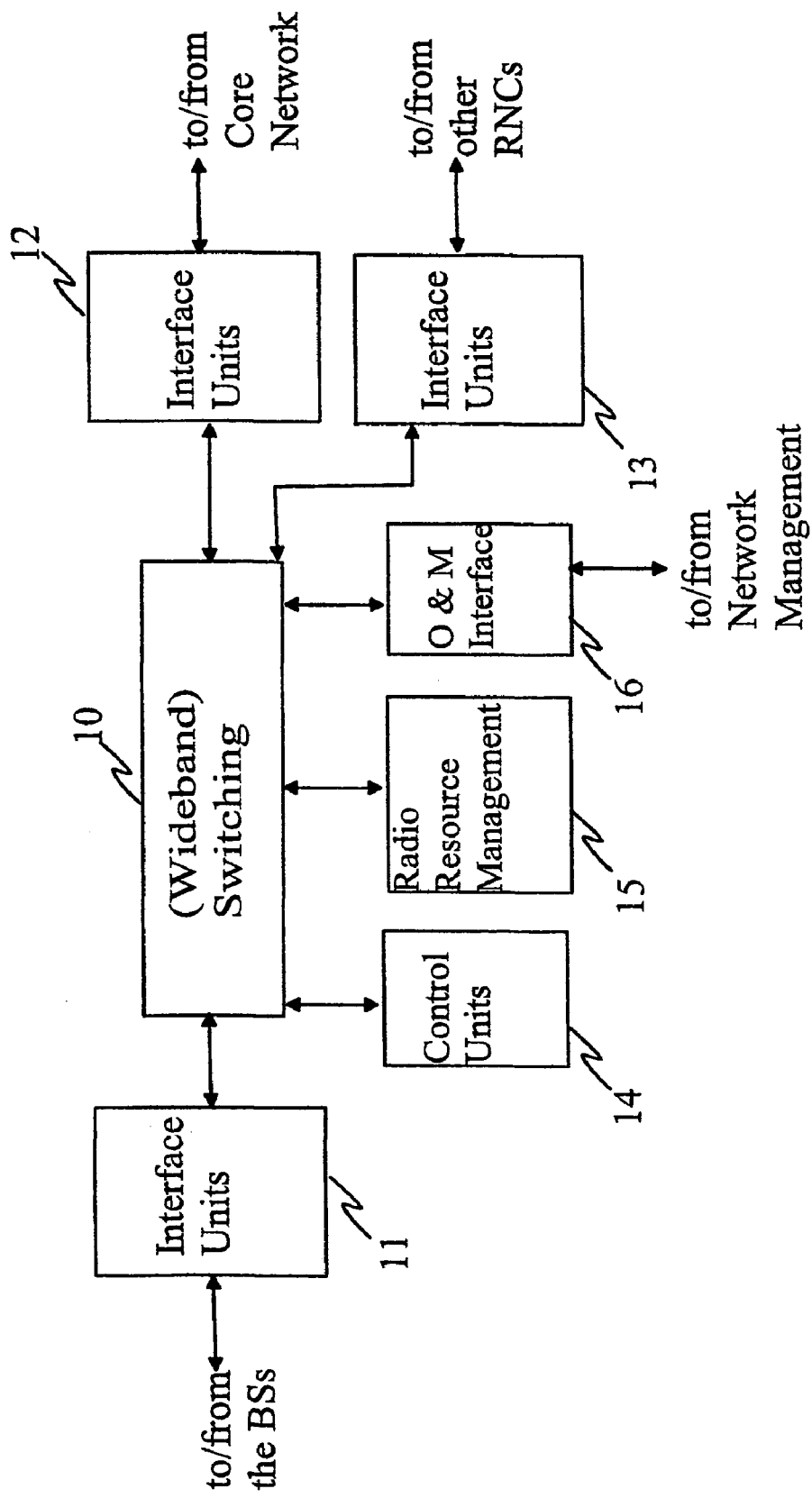
FIG. 6 presents a block diagram of a radio network controller.

FIG. 6 presents a block diagram of a radio network controller RNC. Logically the RNC is composed of only two parts, i.e. a broadband switching block 10 and controlling entities, i.e. Control Units block 14, Radio Resource Management block 15, and Operation and Management block 16 (from where there is a connection to the OSS, i.e to the NMS). On the Iub interface end the RNC comprises a first Interface Unit 11, and on the Iu interface end the RNC comprises a second Interface Unit 12. Further there is a third Interface Unit 13 for connections from the RNC to other RNCs. The routing table of the RNC is implemented in the Control Units block 14, which to its hardware implementation is like a computer. Therefore as is known a table, such as the one shown in Table 1 can be implemented as a program in the Control Units block 14, which implements all RNC control functionalities and the RRC protocol as well as the RANAP protocol and handles the MNC and MCC, as well as LAC and RAC.

This program is stored in a non-transitory computer-readable medium.

The above has been an introduction of the realization of the invention and its embodiments using examples. It is self evident to persons skilled in the art that the invention is not limited to the details of the above presented examples and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

The invention provides benefits for network operators in that a good coverage can be obtained with low costs (with small investments). Typical areas where to use Multiple Operator RAN are rural and suburban areas and other low traffic coverage needed places e.g. subways and places where it's hard to find spots to place several base stations (whereby operators may rather share a base station). Cost savings to operators comes from sharing the RAN, i.e. as described here sharing RNCs and BTSs as well as the OSS. In addition transmission and transport (i.e. transmission lines such as cables) can be shared and the RNP (Radio Network Planning) which is done in the OSS.

The invention claimed is:

1. A method, comprising:
    connecting at least two different core networks to one radio access network;
    sharing a base station of the radio access network between that at least two different core networks by using a first frequency to establish a first cell at the base station for one or the at least two different core networks and using a second frequency to establish a second cell at the base station for another one of the at least two different core networks, wherein a cellular radio network includes a radio access network and a core network, the radio access network comprising at least a radio network controller and a plurality of base stations;
    sharing a radio network controller of the radio access network between the at least two different core networks; and
    creating an allocation of traffic between the base station and the at least two different core networks using the shared radio network controller, wherein the allocation comprises a determination of first traffic for the first cell established at the base station to be associated with a first core network of the at least two different core networks, and wherein the allocation further comprises a determination of second traffic for the second cell established at the base station to be associated with a second core network of the at least two different core networks.

2. A method according to claim 1, wherein the at least two different core belong to different network operators.

3. A method according to claim 1, further comprising forming a base station cell by creating at least three different sectors, and wherein the sharing of a base station comprises using a first sector of the cell for one of the at least two different core networks and using a second sector of the cell for another one of the at least two different core networks.

4. A method according to claim 1, wherein the core network comprises first network elements for circuit switched communication and second network elements for packet switched communication and the allocation of traffic between the base station and the two different core networks creates an allocation between circuit switched traffic at the base station and the first network elements of that core network of the at least two core networks to which the traffic is intended and an allocation between the packet switched traffic at the base station and the second network elements of that core network of the at least two core networks to which the traffic is intended.

5. The method according to claim 1, further comprising:
    using a first code in the first cell corresponding to the one of the at least two different core networks, and using a second code in the second cell corresponding to the another one of the at least two different core networks.

6. The method according to claim 5, further comprising:
    storing at the radio network controller sharing determination to route the first cell traffic to the one of the at least two different core networks based on the first code and to route the second cell traffic to the another one of the at least two different core networks based on the second code.

7. A system, comprising:
    at least two different core networks and one radio access network connected to each of the at least two core networks,
    wherein the system comprises at least a radio network controller and a plurality of base stations, and each core network comprises network elements, wherein the radio network controller is configured to be shared between the at least two different core networks,
    wherein at least one base station of the plurality of base stations is configured to be used by each of the
    at least two different core networks, wherein the at least one base station comprises a transceiver configured to transceiver at a first frequency to establish a first cell for one of the at least two different core networks and configured to transceiver at a second frequency to establish a second cell for another one of the at least two different core networks, wherein the radio network controller comprises a routing table, and wherein the routing table is configured to create an allocation of traffic between a base station of the at least one base station and the at least two different core networks, wherein the allocation comprises a determination of first traffic for the first cell established at the base station to be associated with a first core network of the at least two core networks, and wherein the allocation further comprises a determination of second traffic for the second cell established at the base station to be associated with a second core network of the at least two core networks.

8. An apparatus, comprising:
at least one processor; and
at least one memory including computer program code, where the at least one memory and the computer program code are configured, with the at least one processor, to cause the apparatus to at least:
connect to at least two different core networks;
connect to a plurality of base stations;
share a radio network controller between the at least two different core networks; and
using a routing table in the shared radio network controller to create an allocation between traffic to and from a base station of the plurality of base station and the two different core networks, wherein the apparatus is further cause to determine first traffic for a first cell established at a base station of the plurality of base stations to be associated with a first core network of the at least two different core networks, and wherein the allocation further comprises a determination of second traffic for a second cell established at the base station to be associated with a second core network of the at least two different core networks in order to allocate the traffic from one of the plurality of base stations to either one of the at least two core networks based on the cell used at the base station for the particular traffic.

9. The apparatus according to claim 8, wherein the apparatus is further caused to determine a certain first code used in the first cell to correspond to a certain one of the at least two core networks to which the traffic is intended, and to determine a certain second code used in the second cell to correspond to a certain other one of the at least two core networks in order to allocate the traffic from one of the plurality of cells to either one of the at least two core networks based on the code used in the cell.

10. A method, comprising:
connecting at least two different core networks to one radio access network;
sharing a radio network controller of the radio access network between the at least two different core networks, wherein the at least two different core networks belong to different network operators; and
creating a routing table in the radio network controller, the routing table creating an allocation of traffic between a base station and the at least two different core networks, wherein the allocation comprises a determination of first traffic for a first cell established at the base station to be associated with a first core network, of the first network operator, of the at least two different core networks, and wherein the allocation further comprises a determination of second traffic for a second cell established at the base station to be associated with a second core network, of the second network operator, of the at least two different core networks.

11. A method according to claim 10, further comprising sharing a base station of the radio access network between the at least two different core networks.

12. A method according to claim 11, wherein the sharing the base station further comprises using a first frequency to establish a first cell at the base station for one of the at least two different core networks and using a second frequency to establish a second cell at the base station for another one of the at least two different core networks.

13. A method according to claim 11, wherein the method comprises forming a base station cell by creating at least three different sectors, and wherein the sharing of a base station comprises using a first sector of the cell for one of the at least two different core networks and using a second sector of the cell for another one of the at least two different core networks.

14. A method according to any of claims 10, wherein the sharing the radio network controller further comprises using the at least one network element in communication between each of the core networks and subscriber devices of each of the core networks.

15. The method according to claim 10, wherein the core network comprises first network elements for circuit switched communication and second network elements for packet switched communication and the routing table creates an allocation between circuit switched traffic at the base station and the first network elements of that core network of the at least two core networks to which the traffic is intended and an allocation between packet switched traffic at the base station and the second network elements of that core network of the at least two core networks to which the traffic is intended.

16. A method, comprising:
connecting at least two different core networks to one radio access network;
sharing a radio network controller of the radio access network between the at least two different core networks, wherein the at least two different core networks belong to different network operators; and
creating a routing table in the radio network controller, the routing table creating an allocation between a base station and the at least two different core networks, wherein the allocation comprises a determination of first traffic for a first cell, allocated to a first network operator, established at a base station to be associated with a first core network, of the first network operator, of the at least two core networks, and wherein the allocation further comprises a determination of second traffic for a second cell, allocated to a second network operator, established at the base station to be associated with a second core network, of the second network operator, of the at least two different core networks.

17. The method according to claim 16, wherein the sharing the radio network controller further comprises using the at least one network element in communication between each of the core networks and subscriber devices of each of the core networks.

18. A non-transitory computer-readable medium tangibly embodying a computer program, the computer program executable to control a processor to implement a method, the method comprising:
connecting at least two different core networks to one radio access network;
sharing a radio network controller of the radio access network between the at least two different core networks, wherein the at least two different core networks belong to different network operators; and creating a routing table in the radio network controller, the routing creating an allocation between a base station and the at least two different core networks, wherein the allocation comprises a determination of first traffic for a first cell, allocated to a first network operator, established at a base station to be associated with a first core network, of the first network operator, of the at least two different core networks, and wherein the allocation further comprises a determination of second traffic for a second cell, allocation to a second network operator, established at the base station to be associated with a second core network of the at least two different core networks.

19. A non-transitory computer-readable medium embodying a computer program, the computer program executable to control a processor to implement a method, the method comprising:

connecting at least two different core networks to one radio access network;

sharing a radio network controller of the radio access network between the at least two different core networks, wherein the at least different core networks belong to different network operators; and creating a routing table in the radio network controller, the routing table creating an allocation of traffic between a base station and the at least two different core networks, wherein the allocation comprises a determination of first traffic for a first cell established at the base station to be associated with a first core network, of a first network operator, of the at least two different core networks, and wherein the allocation further comprises a determination of second traffic for a second cell established at the base station to be associated with a second core network, of a second network operator, of the at least two different core networks.

* * * * *

UNITED STATES PATENT AND TRADEMARK OFFICE
CERTIFICATE OF CORRECTION

| | | |
|---|---|---|
| PATENT NO. | : 7,986,971 B2 | Page 1 of 1 |
| APPLICATION NO. | : 10/471381 | |
| DATED | : July 26, 2011 | |
| INVENTOR(S) | : Anckar et al. | |

It is certified that error appears in the above-identified patent and that said Letters Patent is hereby corrected as shown below:

Col. 9, line 67 delete "that" in front of at.

Col. 10, line 2 delete "or" and insert --of--.

Col. 10, line 23 insert --networks-- in-between core and belong.

Col. 10, line 38 delete "the" in-between between and packet.

Col. 11, line 2 delete "transceiver" and insert --transceive--.

Col. 11, line 31 delete "cause" and insert --caused--.

Col. 13, line 4 insert --table-- in-between routing and creating.

Signed and Sealed this
Thirty-first Day of January, 2012

David J. Kappos
*Director of the United States Patent and Trademark Office*